United States Patent [19]

Saghatchi

[11] Patent Number: 5,228,338
[45] Date of Patent: Jul. 20, 1993

[54] FLOW SENSOR CONNECTOR

[75] Inventor: Hamid Saghatchi, Orange, Calif.

[73] Assignee: DXL USA, Torrance, Calif.

[21] Appl. No.: 746,236

[22] Filed: Aug. 15, 1991

Related U.S. Application Data

[63] Continuation-in-part of Ser. No. 624,165, Dec. 7, 1990.

[51] Int. Cl.$^5$ .............................................. G01F 15/18
[52] U.S. Cl. ......................................... 73/201; 73/202; 285/332; 285/382
[58] Field of Search ............ 73/49.8, 201, 202, 202.5; 138/90; 285/332, 332.2, 332.3, 332.4, 382, 910

[56] References Cited

U.S. PATENT DOCUMENTS

| | | | |
|---|---|---|---|
| 511,937 | 1/1984 | Decarie | 285/332.4 |
| 1,122,967 | 1/1914 | Mass | 73/201 |
| 1,495,011 | 5/1924 | Ford | 73/201 |
| 2,147,343 | 2/1939 | Hokanson | 285/332.4 X |
| 2,313,861 | 3/1943 | Caldwell | 285/332.4 |
| 2,315,792 | 4/1943 | Hoss | 285/332.4 X |
| 2,594,618 | 4/1952 | Booth | 73/202 X |
| 2,594,618 | 4/1952 | Booth | 73/202 X |
| 2,611,485 | 9/1986 | Leslie | 73/49.8 |
| 5,018,555 | 5/1991 | Hawerkamp | 285/332.4 X |

Primary Examiner—Herbert Goldstein

[57] ABSTRACT

A disconnectable flow connector is formed of (a) a frusto-conical taper pin having a longitudinal bore through which the end portion of a flow tube of a mass flow sensor is inserted and secured and (b) a connector base containing a matched frusto-conical taper bore. The taper pin can be press-fit into the taper bore to form a fluid flow passage having a leakage level less than about $10^{-9}$ scc/sec helium. with a series of spaced apart, transverse grooves separated by lands in sealing engagement with the matched taper bore.

2 Claims, 1 Drawing Sheet

FLOW SENSOR CONNECTOR

CROSS-REFERENCE TO RELATED APPLICATION

This application is a continuation-in-part of application Ser. No. 07/624,165 filed Dec. 7, 1990, for "Flow Sensor Connector and Method for Making the Same."

BACKGROUND OF THE INVENTION

1. Field of the Invention

This invention relates to the mechanical arts. In particular, it relates to connectors for fluid flow tubes and methods for making the connectors.

2. Discussion of Relevant Art

The measurement and control of the flow of gases is important in many industries. During the manufacture of semiconductors, for example, many of the processes require a precise reaction of two or more gases under carefully controlled conditions. Since chemical reactions occur on a molecular level, the control of mass flow is the most direct way to regulate the reactants.

There have been developed in the art a variety of instruments for measuring the mass flow rate of gases from below 5 standard cubic centimeters (scc) per minute to more than 500,000 scc/min. The prevalent design of such instruments requires that the flow of the gas be divided into two or more paths. Representative instruments include the flow meters disclosed in U.S. Pat. Nos. 4,524,616 and 3,983,384, which patents are herein incorporated by reference.

In a typical instrument, a small flow is routed through a fluid flow tube located in a flow sensor assembly, where the flow is measured, while most of the flow is routed through a splitter section located in parallel with the flow sensor assembly.

The flow sensor assembly must be easily removable from the flow meter for servicing, yet when in place it must be sealed from the external environment to an extraordinary extent. For example, it is necessary to seal around the end portions of the fluid flow tube to avoid any cross flow between the atmosphere and the process gas. Typically, a leak between the process gas and the atmosphere greater than about $10^{-9}$ scc/sec helium causes a problem of some type.

Because of the small size of the fluid flow tube and the severe limitation on the types of sealing materials available due to the interaction between the sealing material and process gases, a major problem with existing mass flow meters is leakage of the flow sensor assembly. Existing mass flow meters use one of two methods to attach the end portions of the fluid flow tube to the remainder of the flow meter. They either use rubber O-rings alone or they use braze joints between the end portions of the fluid flow tube and washers which then mate with rubber or metal O-rings.

Rubber O-rings are limited in their application, because of their interaction with highly reactive process gases and because they are porous to light gases at leakage levels around $10^{-6}$ scc/sec of helium. Metal O-rings are expensive and normally cannot be reused once the flow sensor assembly has been removed for servicing. Both rubber and metal O-rings form pockets which can trap impurities. Braze joints introduce a new material (braze alloy) into the flow stream which may react with some of the highly reactive process gases used in semiconductor manufacturing.

Attempts have been made to us taper pin connectors to seal flow tubes in mass flow meters. Unfortunately, the attempts have been unsuccessful due to the difficulty of making very small taper pins and the corresponding taper bores with sufficient accuracy and with surfaces having sufficiently smooth and complimentary finishes to form an essentially leak-free connection.

SUMMARY OF THE INVENTION

Now in accordance with the invention, it is possible to simply and economically manufacture taper pin connectors for mass flow meters with sufficient accuracy and with surfaces having the necessary tolerances, so that an essentially leak-free connection is made to the flow tube. The flow meter in accordance with this invention has an elongate housing with a fluid inlet, a fluid outlet and a fluid passage between the two. The fluid passage contains a flow splitter section. The flow splitter section is operationally connected in parallel to a flow sensor assembly which measures the rate of fluid flow.

The flow sensor assembly contains a flow tube having a first end portion to receive fluid from the flow splitter section through a disconnectable inlet flow connector and, downstream of the inlet flow connector, a second end portion to return the fluid to the flow splitter section through a disconnectable outlet flow connector.

The flow connectors are formed of (a) a frusto-conical taper pin having a longitudinal bore, through which the end portion of the flow tube is inserted and secured and (b) a connector base containing a matched frusto-conical taper bore, such that the taper pin can be press-fit into the taper bore to form a connection having a leakage level less than about $10^{-9}$ scc/sec helium.

The flow sensor connector is made using a master taper pin tool and a master connector base tool having pre-matched frusto-conical surfaces. The taper pin bore is made by inserting a relatively hard master taper pin tool into a taper pin bore in a substantially softer connector base precursor, with a force sufficient to deform the surface of the taper pin bore and form a taper pin bore with a frusto-conical surface having a taper angle and a surface finish substantially identical to the taper angle and surface finish of the frusto-conical surface of the master taper pin tool.

The taper pin is made by inserting a relatively soft taper pin precursor into a taper pin bore in a substantially harder master connector base tool, with a force sufficient to deform the relatively soft surface of the taper pin precursor and form a taper pin with a frusto-conical surface having a taper angle and a surface finish substantially identical to the taper angle and surface finish of the frusto-conical surface of the master connector base tool.

In accordance with an alternative embodiment of the aforedescribed taper pin, the frusto-conical outer surface of the pin may be provided with a series of longitudinally spaced apart, transverse grooves separated by lands in sealing engagement with the matched taper bore in the connector base. The labyrinth type sealing arrangement thus provided results in further reductions in leakage rates.

DETAILED DESCRIPTION OF THE PREFERRED EMBODIMENTS

As required, details of illustrative embodiments of the invention are disclosed. However, it is to be understood that these embodiments merely exemplify the invention which may take forms different from the specific embodiments disclosed. For example, while the detailed description of the preferred embodiments describes flow meters, per se, it is to be understood that the flow meter can be combined with a valve and used to control the flow of a fluid. Unless otherwise clearly indicated, the term flow meter as used in the specification and claims includes both flow meters and flow controllers.

And while the taper connector is described with regard to mass flow instruments, the connectors of the present invention can be employed in volume flow instruments or in any instrument where it is desired to take advantage of the connector's sealing ability and its resistance to reactive fluids. Structural and functional details are not necessarily to be interpreted as limiting, but as a basis for the claims.

Figure 1:
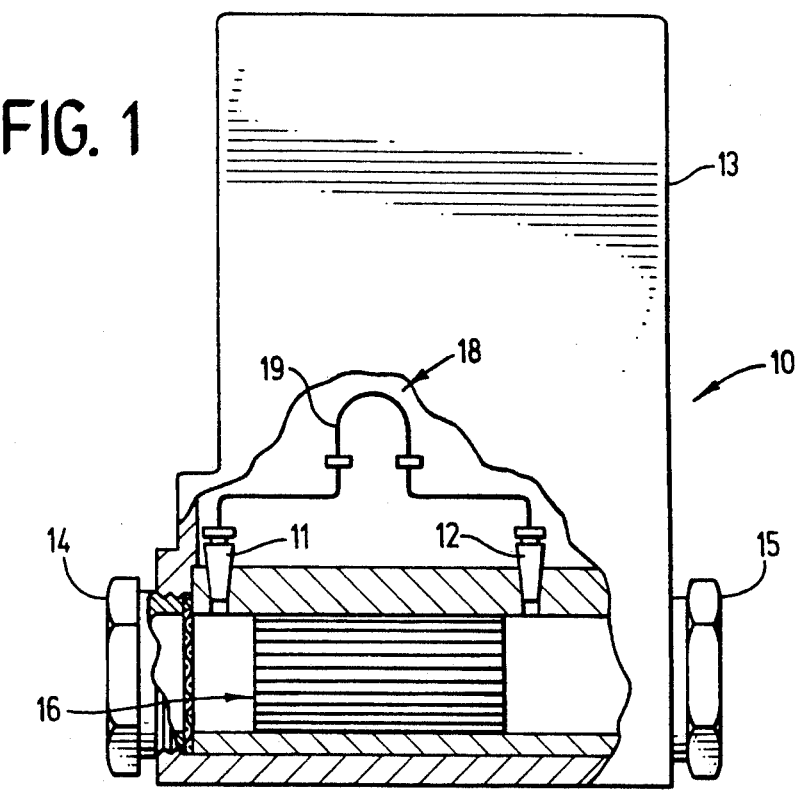
FIG. 1 is a schematic illustration, in partial cross-section, of a flow meter incorporating a flow connector in accordance with the invention.

Referring to FIG. 1 there is shown a flow meter 10 incorporating two disconnectable flow connectors, 11 and 12, in accordance with the invention. The flow meter 10 has an elongate housing 13 with a fluid inlet 14, a fluid outlet 15 and a fluid passage between the two. The fluid passage is formed by two fluid paths, one of which is formed by a flow splitter section 16 and the other by a flow sensor assembly 18.

The flow sensor assembly 18 contains a flow tube 19 connected across a longitudinal portion of the flow splitter section 16. A first end portion of the flow tube 19 is adapted to receive fluid through the inlet flow connector 11 connected with the interior of the flow splitter section 16. Downstream of the inlet flow connector 11, a second end portion of the flow tube 19 returns the fluid diverted into the sensor assembly 18 to the flow splitter section 16 through an outlet flow connector 12.

Figure 2:
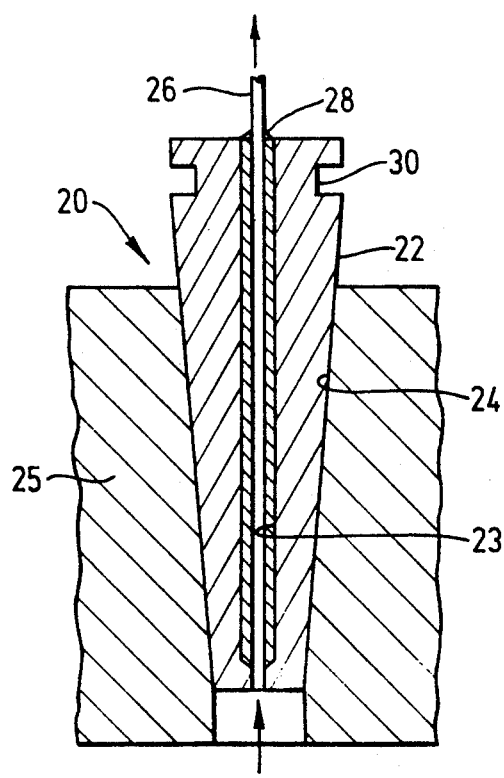
FIG. 2 is an illustration, cut away, of a flow connector in accordance with the invention.

Referring to FIG. 2, there is shown a disconnectable flow connector 20 in accordance with the invention. The flow connector 20 is made of any metal which does not react with the process fluids. The preferred metal is stainless steel, most preferably type 316 or 316L stainless steel.

The flow connector 20 has a frusto-conical taper pin 22 having a longitudinal bore 23 therethrough. The taper pin 22 is press fit into a matched, frusto-conical taper bore 24, in a connector base 25, to form a fluid flow passage having a leakage level less than about $10^{-9}$ scc/sec of helium.

The end portion of a fluid flow tube 26 is inserted into the longitudinal bore 23 and secured to its walls. Typically, the fluid flow tube 26 is a capillary tube having an outer diameter of from about 0.010 to about 0.060 inches. In the embodiment shown in FIG. 2, the bottom of the taper pin 22 has been welded to the end portion of the fluid flow tube 26 to secure the fluid flow tube. Other means for securing the fluid flow tube 26 include brazing, swaging and the use of adhesives. A supporting sealant 28, such as an epoxy resin, is used to fill the gap between the walls of the bore 2 and the outside walls of the fluid flow tube 26.

When the taper pin 22 is press-fit in the connector base 25 there is formed a connection having a leakage level of less than about $10^{-9}$ scc/sec helium. It is another advantage of the connectors in accordance with the invention that the taper pin 22 can be disconnected from the connector base 25 and the connection remade many times without deteriorating the integrity of the seal. Disconnection of the taper pin is facilitated by a removal groove 30.

It is yet another advantage of the invention that no materials other than the surfaces of the fluid flow tube 26 and of the taper bore 24 need be in contact with the gas stream, thus eliminating any problem which could arise if any additional materials came into contact with reactive process gases. Additionally, the design of the flow connector 20 is made such that there are no trapped gases left within the passages which cannot be fully purged.

Now in accordance with the invention, there has also been found an economical method for simply producing the matched tapered surfaces using a frusto-conical master taper pin tool and a master connector base tool having a frusto-conical tape bore. The frusto-conical surfaces of the master tools are precisely machined, using conventional methods, to produce pre-matched surfaces. The frusto-conical master taper pin tool is formed of a relatively hard metal, such as a hardened tool steel. Generally, the hardened metal has a Rockwell Hardness of from about 55 C to about 65 C.

A connector base precursor, containing a frusto-conical taper bore, is formed of substantially softer metal, such as an annealed stainless steel, using conventional techniques. Typically, the connector base precursor has a Brinell hardness of from about 140 to about 190. The taper angle of the surface of the taper bore is approximately equal to or slightly greater than the taper angle of the taper pin bore in the final connector base.

A final taper pin bore is then formed by inserting the relatively hard master taper pin tool into the substantially softer taper pin bore in the connector base precursor with sufficient force to deform the surface of the taper pin bore, so that it is has a taper angle and a surface finish which are substantially identical to the taper angle and finish of the surface of the master taper pin tool. It is desirable that the master taper pin tool be as hard as practical and that the connector base precursor be as soft as practical, to make the deformation as easy as possible, thereby maximizing the lifetime of the master taper pin tool.

Similarly, a master connector base tool having a frusto-conical taper bore is formed of a relatively hard metal, such as a hardened tool steel. Generally, the hardened metal has a Rockwell Hardness of from about 55 C to about 65 C.

A frusto-conical taper pin precursor is formed of a substantially softer metal, such as an annealed stainless steel, using conventional techniques. Typically, the taper pin precursor has a Brinell hardness of from about 140 to about 190. The taper angle of the taper pin precursor is approximately equal to or slightly smaller than the taper angle of the final taper pin.

A taper pin having a matched taper surface is then formed from the taper pin precursor by inserting the relatively soft taper pin precursor into the substantially harder taper pin bore of the master connector base tool with sufficient force to deform the surface of the taper pin so that it has a taper angle and a surface finish which is substantially identical to taper angle and the surface finish of the frusto-conical taper bore in the master connector base tool. It is desirable that the master connector base tool be as hard as practical and that the taper pin precursor be as soft as practical, to make the deformation as easy as possible, thereby maximizing the lifetime of the master taper pin tool.

Figure 3:
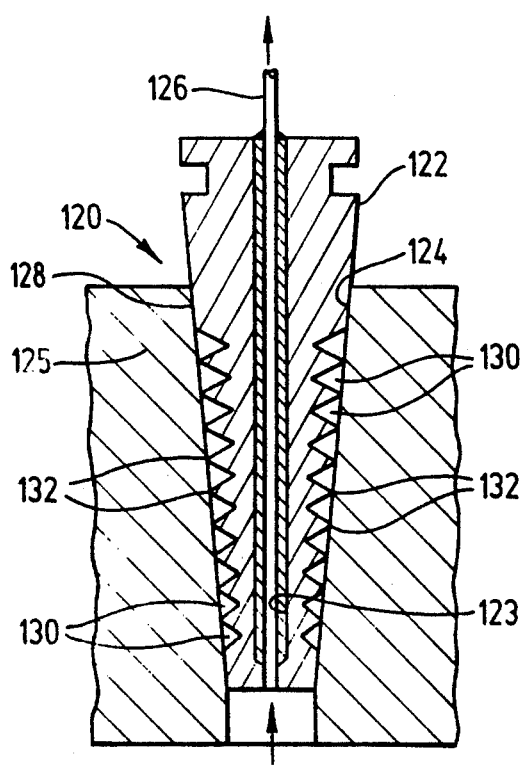
FIG. 3 is an illustration, cut away, of a flow connector in accordance with an alternative embodiment of the invention.

Referring now to FIG. 3, there is shown a disconnectable flow connector 120 in accordance with an alternative embodiment of the invention capable of reducing leakage even further. Like the flow connector 20, the connector 120 may be made of any metal which does not react with the process fluids.

The flow connector 120 includes a frusto-conical taper pin 122 having a longitudinal through-bore 123. The taper pin 122 is press fit into a matching, frusto-conical taper bore 124 in a connector base 125 to form a fluid passage having a leakage level substantially less than the minimum discussed earlier. The end portion of a flow tube 126 is inserted into the bore 123 and secured to its walls in the fashion already described in connection with the embodiment of FIG. 2.

The taper pin 122 of the alternative embodiment of FIG. 3 is characterized by an outer tapered surface 128 having formed therein a series of transverse grooves 130 Which may be, for example, generally V-shaped in cross section and which are spaced apart longitudinally along the surface 128 within the confines of the upper and lower extremities of the bore 124. The grooves 130 are separated by lands 132 thereby providing a series of metal-to-metal seals between the taper pin 122 and the taper bore 124.

The labyrinth-type seal provided by the taper pin 122 is more reliable and less susceptible to geometric or dimensional variations. Higher contact pressures are present at each land 132 or sealing location as a result of the reduced contact surface area. The portions of the taper pin 122 between adjacent grooves 130 are more compliant due to their geometry and therefore more forgiving of dimensional variations between the outer surface 128 of the taper pin and the bore 124. If a finite amount of leakage through the entire flow connector is to be present, such leakage rate will be reduced as a result of the consecutive pressure drops across the series of spaced lands 132.

It will be understood that the method for making a tapered pin in accordance with the alternative embodiment may be the same as that discussed in connection with the first embodiment.

What is claimed is:

1. A flow meter having a fluid inlet, a fluid outlet, and a fluid passage between the two, where the fluid passage comprises:
   1) a flow splitter section;
   (2) a disconnectable inlet flow connector comprising:
   (a) a frusto-conical taper pin having a longitudinal bore therethrough, and
   (b) a connector base containing a matched frusto-conical taper bore, such that the taper pin is press-fittable in the taper bore to form a connection having a leakage level less than about $10^{-9}$ scc/sec helium;
   3) a disconnectable outlet flow connector comprising:
   (a) a frusto-conical taper pin having a longitudinal bore therethrough, and
   (b) a connector base containing a matched frusto-conical taper bore, such that the taper pin is press-fittable in the taper bore to form a connection having a leakage level less than about $10^{-9}$ scc/sec helium;
   4) a flow sensor assembly containing a flow tube having a first end portion adapted to receive fluid from the flow splitter section, through the inlet flow connector, and, downstream of the inlet flow connector, a second end portion adapted to return the fluid to the flow splitter section, through the outlet flow connector; and wherein the frusto-conical taper pins of the disconnectable inlet and outlet flow connectors each includes an outer, frusto-conical taper surface having a series of longitudinally spaced apart, transverse grooves separated by lands in sealing engagement with the corresponding frusto-conical taper bore.

2. A flow meter in accordance with claim 1 wherein each groove has a generally V-shaped cross section.

* * * * *